United States Patent
Ogura

(10) Patent No.: US 11,297,531 B2
(45) Date of Patent: Apr. 5, 2022

(54) NETWORK APPARATUS AND METHOD THEREFOR

(71) Applicant: NEC Corporation, Tokyo (JP)

(72) Inventor: Daisuke Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 115 days.

(21) Appl. No.: 16/603,070

(22) PCT Filed: Jan. 24, 2018

(86) PCT No.: PCT/JP2018/002039
§ 371 (c)(1),
(2) Date: Oct. 4, 2019

(87) PCT Pub. No.: WO2018/186000
PCT Pub. Date: Oct. 11, 2018

(65) Prior Publication Data
US 2021/0112447 A1     Apr. 15, 2021

(30) Foreign Application Priority Data

Apr. 7, 2017   (JP) .............................. JP2017-076619

(51) Int. Cl.
*H04W 28/06*     (2009.01)
*H04W 72/04*     (2009.01)
*H04W 72/10*     (2009.01)
*H04W 88/18*     (2009.01)

(52) U.S. Cl.
CPC ....... *H04W 28/06* (2013.01); *H04W 72/0433* (2013.01); *H04W 72/10* (2013.01); *H04W 88/181* (2013.01)

(58) Field of Classification Search
CPC ... H04W 88/08–188; H04W 92/00–06; H04W 92/12–16; H04W 92/20–24
See application file for complete search history.

(56) References Cited

U.S. PATENT DOCUMENTS

2012/0087330 A1*   4/2012   Zhu ..................... H04L 65/1016
                                                            370/329
2014/0011514 A1*   1/2014   Gu ......................... G01S 5/0081
                                                            455/456.1
(Continued)

FOREIGN PATENT DOCUMENTS

JP        2013-530586 A      7/2013
JP        2016-225954 A     12/2016
(Continued)

OTHER PUBLICATIONS

International Search Report dated Apr. 24, 2018, in the corresponding PCT International Application.
(Continued)

*Primary Examiner* — San Htun

(57) ABSTRACT

A network apparatus (10, 30) incorporates edge computing related control information (1001, 1101) into a header part (800) of a protocol data unit of an encapsulation protocol that is used to encapsulate a user packet originated from or destined for a radio terminal. Further, the network apparatus (10) transmits the protocol data unit whose header part (800) contains the edge computing related control information (1001, 1101).

8 Claims, 15 Drawing Sheets

(56) References Cited

U.S. PATENT DOCUMENTS

2018/0176039 A1* 6/2018 Shi ..................... H04W 76/12
2018/0249389 A1* 8/2018 Zhu ................... H04W 36/0033

FOREIGN PATENT DOCUMENTS

JP      2017-17656 A      1/2017
WO  WO 2016/174864 A1  11/2016

OTHER PUBLICATIONS

ETSI GS MEC 002 V1. 1. 1 (Mar. 2016) "Mobile Edge Computing (MEC) ; Technical Requirements", pp. 1-40, Mar. 2016.

3GPP TR 36.933 V14.0.0 (Mar. 2017) "3rd Generation Partnership Project; Technical Specification Group Radio Access Network; Study on Context Aware Service Delivery in RAN for LTE; (Release 14)", pp. 1-18, Mar. 2017.

3GPP TR 38.913 V14.2.0 (Mar. 2017) "3rd Generation Partnership Project; Technical Specification Group Radio Access Network; Study on Scenarios and Requirements for Next Generation Access Technologies; (Release 14)", pp. 1-38, Mar. 2017.

Huawei et al., "TS 23.501: Update to Support of Edge Computing", 3GPP TSG SA WG2 Meeting #120, S2-172005, pp. 1-3, Mar. 2017, Best Availability: Mar. 27-31, 2017.

* cited by examiner

| Next Extension Header Field Value | Type of Extension Header |
|---|---|
| 0000 0000 | No more extension headers |
| 0000 0001 | Reserved - Control Plane only. |
| 0000 0010 | Reserved - Control Plane only. |
| 0010 0000 | Service Class Indicator |
| 0100 0000 | UDP Port. Provides the UDP Source Port of the triggering message. |
| 1000 0001 | RAN Container |
| 1000 0010 | Long PDCP PDU Number |
| 1000 1000 | MEC Container from eNB/gNB — 901 |
| 1000 1001 | MEC Container from MEC server — 902 |
| 1100 0000 | PDCP PDU Number [4]-[5]. See NOTE 1. |
| 1100 0001 | Reserved - Control Plane only. |
| 1100 0010 | Reserved - Control Plane only. |

NOTE 1: As an exception to the comprehension rule specified above, for a G-PDU with a Next Extension Header Field set to the value "1100 0000", the SGW shall consider this corresponding extension header as 'comprehension not required'.

Fig. 9

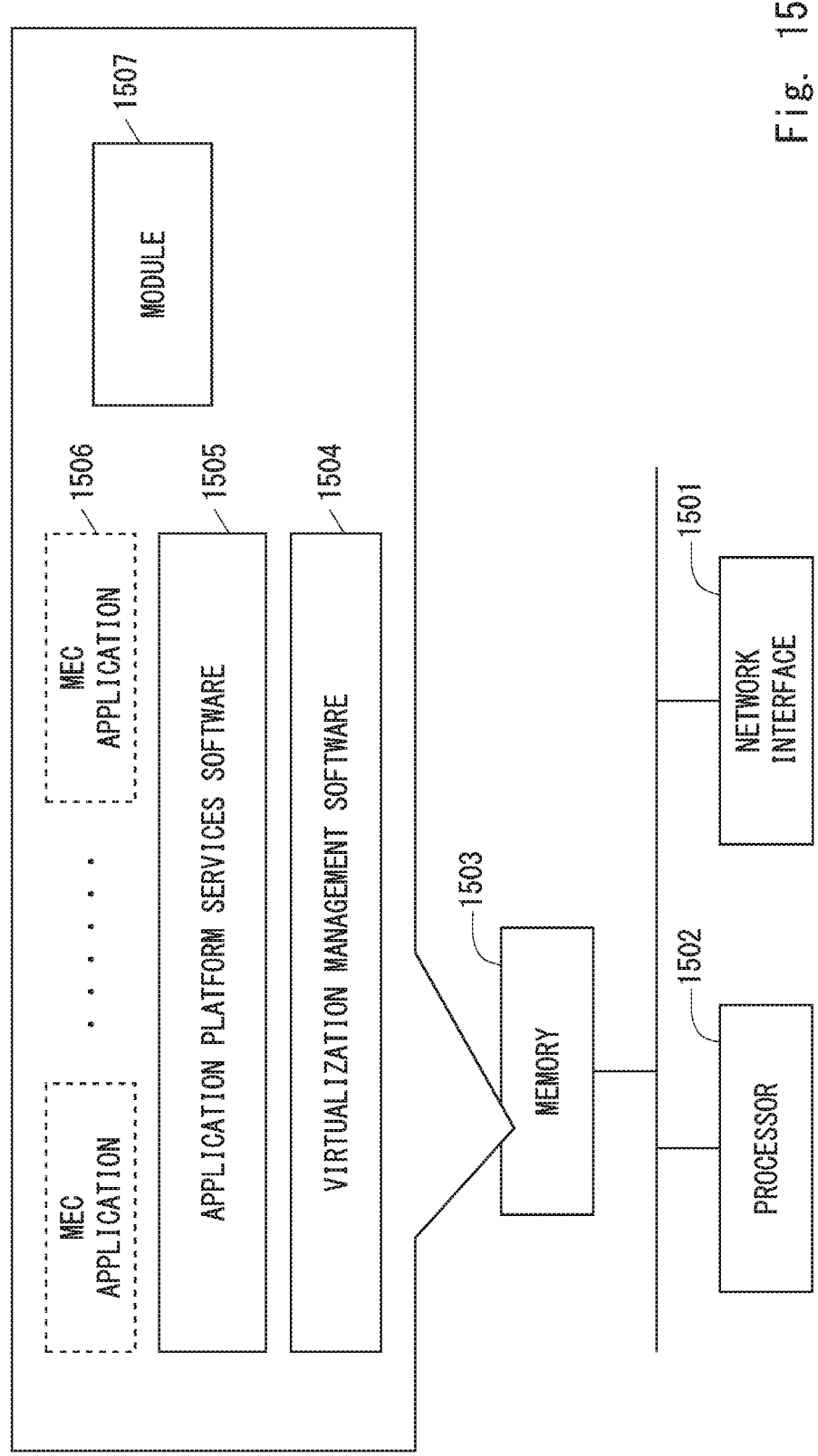

NETWORK APPARATUS AND METHOD THEREFOR

CROSS-REFERENCE TO RELATED PATENT APPLICATIONS

This application is a National Stage Entry of International Application No. PCT/JP2018/002039, filed Jan. 24, 2018, which claims priority from the Japanese Patent Application No. 2017-076619, filed Apr. 7, 2017. The entire contents of the above-referenced applications are expressly incorporated herein by reference.

TECHNICAL FIELD

The present disclosure relates to a mobile communication network and, in particular, to an apparatus and a method for edge computing.

BACKGROUND ART

The European Telecommunications Standards Institute (ETSI) has started standardization of Mobile Edge Computing (MEC) (see Non-Patent Literature 1). The ETSI MEC Industry Specification Group (ISG) has changed its name from "Mobile Edge Computing" to "Multi-access Edge Computing". For example, the MEC offers, to application developers and content providers, cloud-computing capabilities and an information technology (IT) service environment in a Radio Access Network (RAN) in close proximity to mobile subscribers. This environment provides ultra-low latency and high bandwidth as well as direct access to radio network information (e.g., subscriber's location and cell load) that can be leveraged by applications and services.

The MEC is based on a virtualized platform, similar to Network Function Virtualization (NFV). While NFV focuses on network functions, MEC enables applications (referred to as mobile edge applications) to be run at the edge of the network. The MEC server is an entity(ies) including a platform and virtualization infrastructure for providing mobile edge applications with computing resources, storage resources, and network resources. The MEC server may also be referred to as a mobile edge host or a mobile edge cloud.

The Third Generation Partnership Project (3GPP) has stared a study on a solution similar to MEC. This solution is referred to as "Context Aware Service Delivery in RAN" (see Non-Patent Literature 2). The Context Aware Service Delivery in RAN enables a cache server for context aware service delivery to be deployed at the edge of a mobile communication network. Further, one of the requirements for the Next Generation Radio Access Technologies currently studied by the 3GPP is that the RAN architecture shall allow for deployment flexibility (see Non-Patent Literature 3). This deployment flexibility allows, for example, a host relevant RAN, a core network (CN), and application functions to be deployed at the edge of the RAN to enable context aware service delivery and low latency services.

Patent Literature 1 discloses that the General Packet Radio Service (GPRS) Tunneling Protocol for User Plane (GTP-U) protocol is used in order for a Long Term Evolution (LTE) base station (i.e., eNB) to transmit and receive user data to and from an application server (i.e., MEC server) located at the RAN edge.

CITATION LIST

Patent Literature

Patent Literature 1: International Patent Publication No. WO 2016/174864

Non Patent Literature

Non-Patent Literature 1: ETSI GS MEC 002 V1.1.1 (2016-03) "Mobile Edge Computing (MEC); Technical Requirements", March 2016

Non-Patent Literature 2: 3GPP TR 36.933 V14.0.0 (2017-03) "3rd Generation Partnership Project; Technical Specification Group Radio Access Network; Study on Context Aware Service Delivery in RAN for LTE; (Release 14)", March 2017

Non-Patent Literature 3: 3GPP TR 38.913 V14.2.0 (2017-03) "3rd Generation Partnership Project; Technical Specification Group Radio Access Network; Study on Scenarios and Requirements for Next Generation Access Technologies; (Release 14)", March 2017

SUMMARY OF INVENTION

Technical Problem

It may be preferable that the MEC server be able to use an interface for exchanging MEC-related control information with a node in the mobile communication network. The MEC-related control information includes, for example, radio network information to be sent from the mobile communication network to the MEC server, or network control request to be sent from the MEC server to the mobile communication network, or both. The node in the mobile communication network may be a RAN node (e.g., eNB or Radio Network Controller (RNC)) or a core network node (e.g., S-GW or Packet Data Network (PDN) Gateway (P-GW)). Alternatively, the node in the mobile communication network may be a gateway for local breakout (e.g., Local Gateway (L-GW) for Local IP Access (LIPA), L-GW for Selected IP Traffic Offload (SIPTO) at the Local Network, and Standalone Gateway for SIPTO at the Local Network).

Note that, as described above, Patent Literature 1 discloses that the LTE eNB uses the GTP-U protocol to transmit and receive user data to and from the MEC server. However, Patent Literature 1 does not explicitly disclose an interface used by a node (e.g., eNB) in the mobile communication network to exchange MEC-related control information with the MEC server.

One of the objects to be attained by embodiments disclosed herein is to provide an apparatus, a method, and a program that enable a MEC entity (e.g., MEC server) and a network node (e.g., base station, gateway) to exchange MEC-related control information with each other in an uncomplicated manner. The above-described object is merely one of the objects to be attained by the embodiments disclosed herein. Other objects or problems and novel features will be made apparent from the following description and the accompanying drawings.

Solution to Problem

In a first aspect, a network apparatus includes at least one memory and at least one processor coupled to the at least one memory. The at least one processor is configured to: incorporate edge computing related control information into a header part of a protocol data unit of an encapsulation protocol that is used to encapsulate a user packet originated from or destined for a radio terminal; and transmit the protocol data unit whose header part contains the edge computing related control information.

In a second aspect, a method for a network apparatus includes: (a) incorporating edge computing related control information into a header part of a protocol data unit of an encapsulation protocol, the encapsulation protocol being used to encapsulate a user packet originated from or destined for a radio terminal; and (b) transmitting the protocol data unit whose header part contains the edge computing related control information.

In a third aspect, a program includes a set of instructions (software codes) that, when loaded into a computer, causes the computer to perform a method for a network apparatus. The method includes incorporating edge computing related control information into a header part of a protocol data unit of an encapsulation protocol, the encapsulation protocol being used to encapsulate a user packet originated from or destined for a radio terminal.

Advantageous Effects of Invention

According to the above-described aspects, it is possible to provide an apparatus, a method, and a program that enable a MEC entity (e.g., MEC server) and a network node (e.g., a base station, and a gateway) to exchange MEC-related control information with each other in an uncomplicated manner.

BRIEF DESCRIPTION OF DRAWINGS

FIG. 9 is a diagram showing an example of a next extension header type according to an embodiment;

FIG. 15 is a diagram showing a configuration example of a MEC server according to an embodiment.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Figure 1:
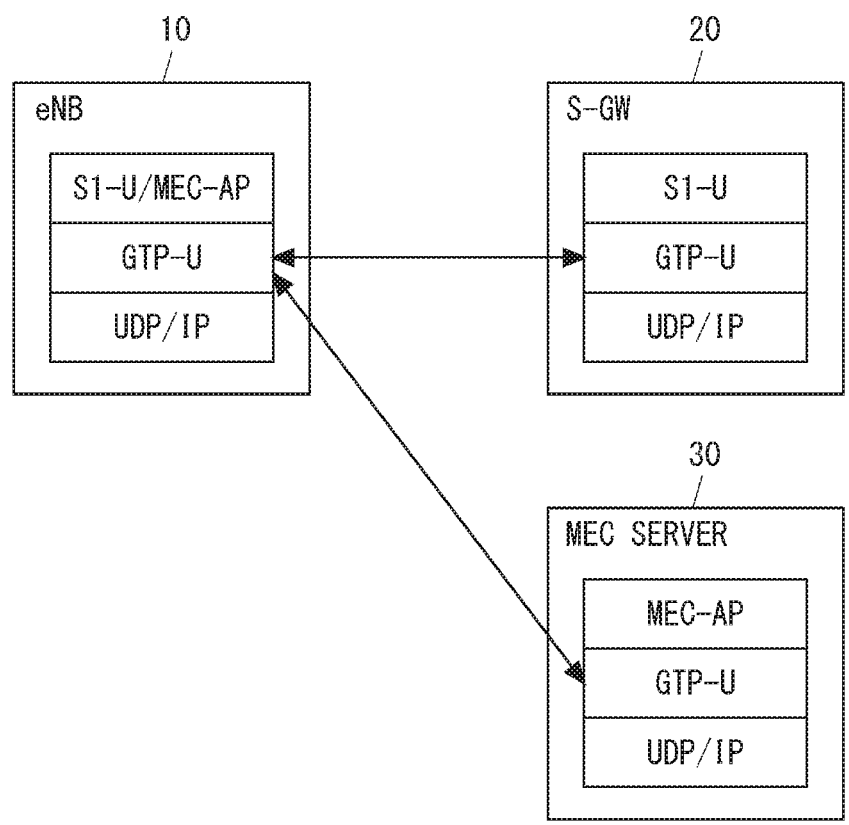
FIG. 1 is a diagram showing a configuration example of a mobile communication network according to an embodiment.
Figure 2:
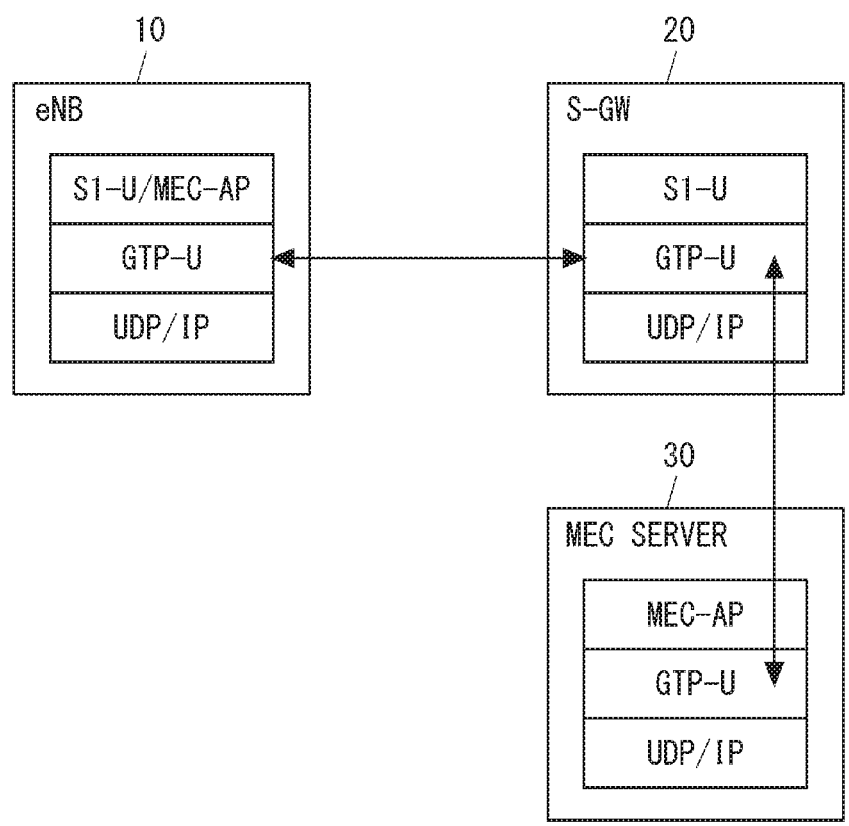
FIG. 2 is a diagram showing a configuration example of a mobile communication network according to an embodiment.
Figure 3:
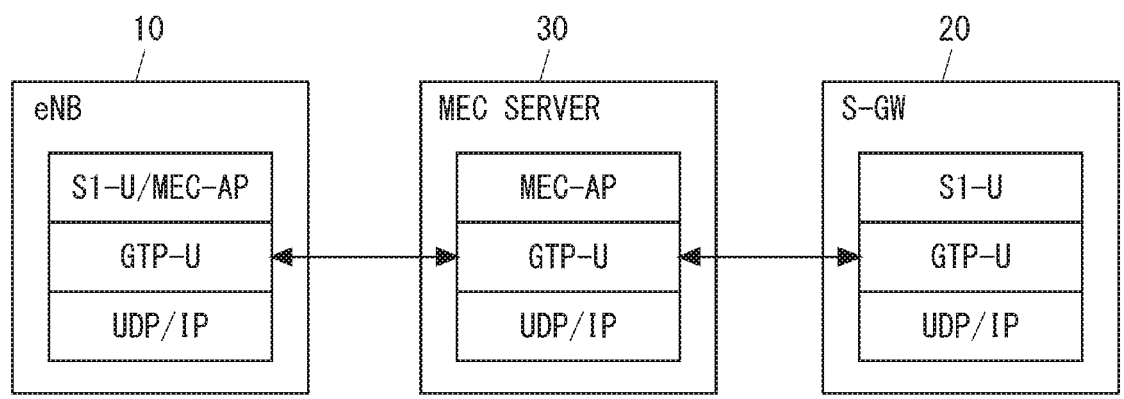
FIG. 3 is a diagram showing a configuration example of a mobile communication network according to an embodiment.

Configuration examples of a mobile communication network according to embodiments are described with reference to FIGS. 1 to 7. FIGS. 1 to 3 show examples of deployment of an LTE system and a MEC server coupled thereto. In the example of FIG. 1, an eNB 10 communicates with an S-GW 20 and a MEC server 30. As is well known, the eNB 10 is a node in a RAN (i.e., Evolved Universal Terrestrial Radio Access Network (E-UTRAN)), while the S-GW 20 is a node in a core network (i.e., Evolved Packet Core (EPC)). The MEC server 30 is coupled to the eNB 10. The MEC server 30 may be located in the same site as the eNB 10.

As described above, the MEC server 30 is an entity(ies) including a platform and virtualization infrastructure for providing mobile edge applications with computing resources, storage resources, network resources, or any combination thereof. The MEC server 30 may also be referred to as a mobile edge host or a mobile edge cloud. Further, the MEC server 30 may be referred to as an Internet of Things (IoT) service enabler.

The eNB 10 uses the GTP-U protocol to send uplink user packets of a radio terminal (i.e., User Equipment (UE)) to a P-GW (not shown) through the S-GW 20, and to receive downlink user packets from the P-GW (not shown) through the S-GW 20. The downlink user packets and the uplink user packets are typically Internet Protocol (IP) packets. Further, in the example of FIG. 1, the eNB 10 also uses the GTP-U protocol to transfer user packets to be transmitted between a mobile edge application instantiated on the MEC server 30 and a UE application running in a UE.

Furthermore, in the example of FIG. 1, the eNB 10 also uses the GTP-U protocol to send MEC-related control information to the MEC server 30 and to receive MEC-related control information from the MEC server 30. Specifically, each of the eNB 10 and the MEC server 30 is configured to incorporate MEC-related control information into a header part (i.e., GTP-U header) of a GTP Protocol Data Unit (GTP-PDU), and transmit the GTP-PDU whose header part contains the MEC-related control information. The details of enhancements or improvements to the GTP-U protocol to allow for sending MEC-related control information will be described later.

The MEC-related control information to be sent from the eNB 10 to the MEC server 30 may include measurement information about the mobile communication network. Specifically, the MEC-related control information to be sent from the eNB 10 to the MEC server 30 may include at least one of: radio interface quality; cell throughput; or backhaul throughput. The radio interface quality may include, for example, a downlink channel quality measured by a UE or an uplink channel quality measured by the eNB 10, or both. The radio interface quality may be a Received Signal Strength Indicator (RSSI), a Channel Quality Indicator (CQI), Reference Signal Received Power (RSRP), Reference Signal Received Quality (RSRQ), or any combination thereof.

Additionally or alternatively, the MEC-related control information to be sent from the eNB 10 to the MEC server 30 may include UE information. The UE information indicates, for example, one or both of information about a service used by a UE and priority information of a UE. The information about a service may include a service type or Quality of Service (QoS), or both. More specifically, the information about a service may be information related to video contents used by a UE. Additionally or alternatively, the UE information may include various information items about characteristics of a UE, for example, location information, security information, charging information, bearer information, or mobility characteristics (e.g., high speed, low speed, movement frequency) of the UE.

The MEC-related control information to be sent from the MEC server 30 to the eNB 10 may be a radio resource control request. The radio resource control request requests the eNB 10 to adjust radio resource management or radio resource scheduling in the RAN. The MEC server 30 may generate a radio resource control request based on the MEC-related control information (e.g., radio interface quality, priority of a UE, or characteristics of a UE) received from the eNB 10. For example, the radio resource control request may request the eNB 10 to release a radio connection(s) (i.e., Radio Resource Control (RRC) connection) of one or more UEs, or to perform an inter-cell or inter-Radio Access Technology (Inter-RAT) handover of one or more UEs. For example, the radio resource control request may request the eNB 10 to adjust a scheduling metric applied to one or more UEs.

Additionally or alternatively, the MEC-related control information to be sent from the MEC server 30 to the eNB 10 may be a traffic control request. The traffic control request requests the eNB 10 to adjust traffic control for user packets to be sent from the eNB 10 to the core network (i.e., the S-GW 20) or the MEC server 30. For example, the traffic control request may request the eNB 10 to perform traffic shaping on user packets to be sent from the eNB 10 to the core network (i.e., the S-GW 20) or the MEC server 30. The traffic control request may indicate an identifier (e.g., UE identifier, or Tunnel Endpoint Identifier (TEID)) related to a packet flow to be subjected to the shaping, flow priority, or a packet transmission rate (e.g., committed information rate (CIR)), or any combination thereof.

In the example of FIG. 2, the MEC server 30 uses the GTP-U protocol to communicate with the S-GW 20, which is a core network node. The S-GW 20 shown in FIG. 2 may be a gateway for local breakout. Specifically, the S-GW 20 may be a standalone GW for SIPTO at the Local Network. The standalone GW includes at least user plane functions of the S-GW and user plane functions of the P-GW.

In FIG. 2, similarly to the example of FIG. 1, the eNB 10 may use the GTP-U protocol to transfer user packets to be transmitted between a mobile edge application instantiated on the MEC server 30 and a UE application running in a UE. The user packets are transferred between the eNB 10 and the MEC server 30 through a GTP tunnel between the eNB 10 and the S-GW 20 and through a GTP tunnel between the S-GW 20 and the MEC server 30.

Furthermore, in the example of FIG. 2, the S-GW 20 uses the GTP-U protocol to send MEC-related control information to the MEC server 30 and to receive MEC-related control information from the MEC server 30. The MEC-related control information may be exchanged between the eNB 10 and the MEC server 30. In other words, the S-GW 20 may relay the MEC-related control information between the eNB 10 and the MEC server 30.

In the example of FIG. 3, the MEC server 30 is located between the eNB 10 and the S-GW 20. In this case, the above-described user packets are transferred between the eNB 10 and the S-GW 20 through a GTP tunnel between the eNB 10 and the MEC server 30 and through a GTP tunnel between the MEC server 30 and the S-GW 20.

FIGS. 4 to 7 show examples of deployment of the fifth generation mobile communication system (5G) and a MEC server coupled thereto. The 3GPP has started in 2016 the standardization for 5G, i.e., 3GPP Release 14, to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the 5G-RAN is referred to as a gNodeB (gNB) or a NR NodeB (NR NB). A new core network for the 5G System is referred to as a 5G Core Network (5GC) or a NextGen Core (NG Core). A radio terminal (UE) capable of being connected to the 5G System is referred to as a 5G UE or a NextGen UE (NG UE), or simply referred to as a UE. The official names of the RAT, UE, radio access network, core network, network entities (nodes), protocol layers and the like for the 5G System will be determined in the future as standardization work progresses.

Figure 4:
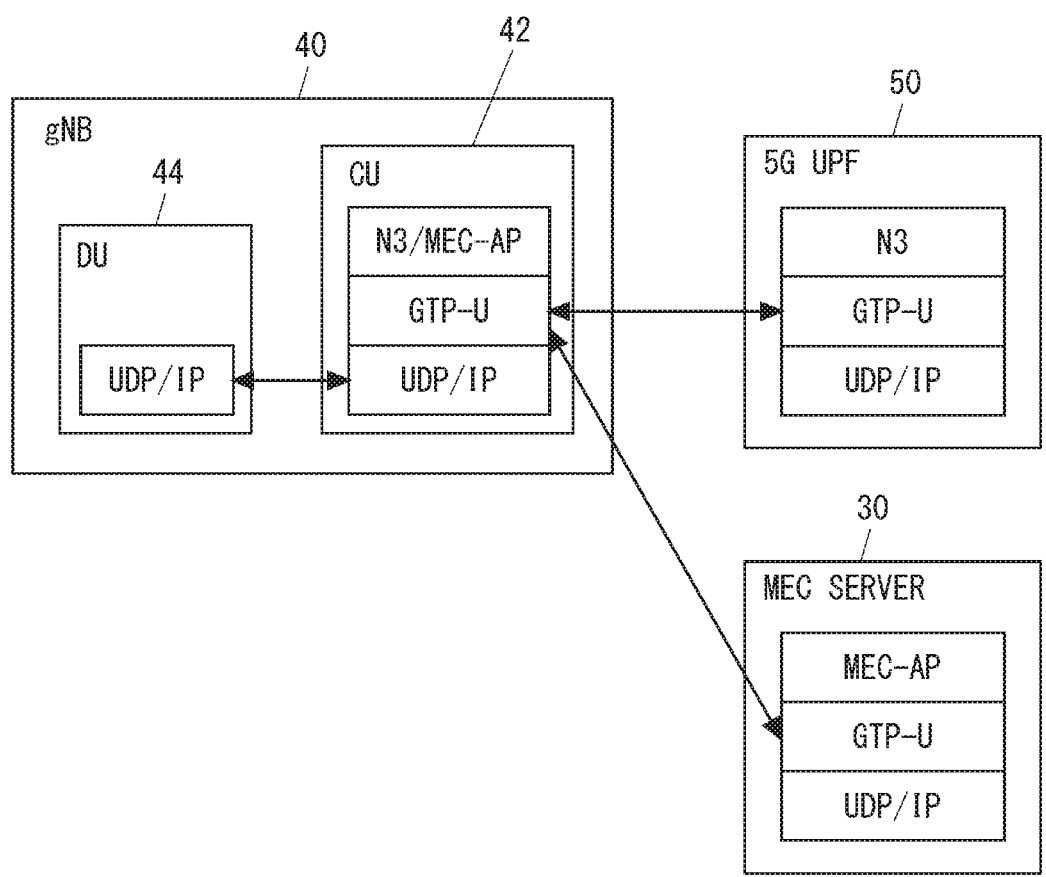
FIG. 4 is a diagram showing a configuration example of a mobile communication network according to an embodiment.

In the example of FIG. 4, a gNB 40 communicates with a user plane function (UPF) 50 and the MEC server 30. The gNB 40 is a node in the 5G RAN. The interface between the 5G RAN (the gNB 40) and the UPF 50 is referred as to an N3 interface (or reference point). The MEC server 30 is coupled to the gNB 40. The MEC server 30 may be located in the same site as the gNB 40.

The gNB 40 may be implemented based on a Cloud Radio Access Network (C-RAN) concept. That is, as shown in FIG. 4, the gNB 40 may include a Central Unit (CU) 42 and at least one Distributed Unit (DU) 44. The CU 42 is also referred to as a Baseband Unit (BBU) or a Central Unit (CU). The DU 44 is also referred to as a Radio Unit (RU), a Remote Radio Head (RRH), a Remote Radio Equipment (RRE), or a Transmission and Reception Point (TRP or TRxP). In the example of FIG. 4, the MEC server 30 uses the GTP-U protocol to communicate with the CU 42.

The gNB 40 (the CU 42) uses the GTP-U protocol to send uplink user packets of the UE to the UPF 50 and to receive downlink user packets from the UPF 50. The downlink user packets and the uplink user packets are typically Internet Protocol (IP) packets. Further, in the example of FIG. 4, the gNB 40 (the CU 42) also uses the GTP-U protocol to transfer user packets to be transmitted between a mobile edge application instantiated on the MEC server 30 and a UE application running in a UE.

Furthermore, in the example of FIG. 4, the gNB 40 (the CU 42) also uses the GTP-U protocol to send MEC-related control information to the MEC server 30 and to receive MEC-related control information from the MEC server 30. Specifically, each of the gNB 40 (the CU 42) and the MEC server 30 is configured to incorporate MEC-related control information into a header part (i.e., GTP-U header) of a GTP-PDU, and transmit the GTP-PDU whose header part contains the MEC-related control information. The details of enhancements or improvements to the GTP-U protocol to allow for sending MEC-related control information will be described later.

Figure 5:
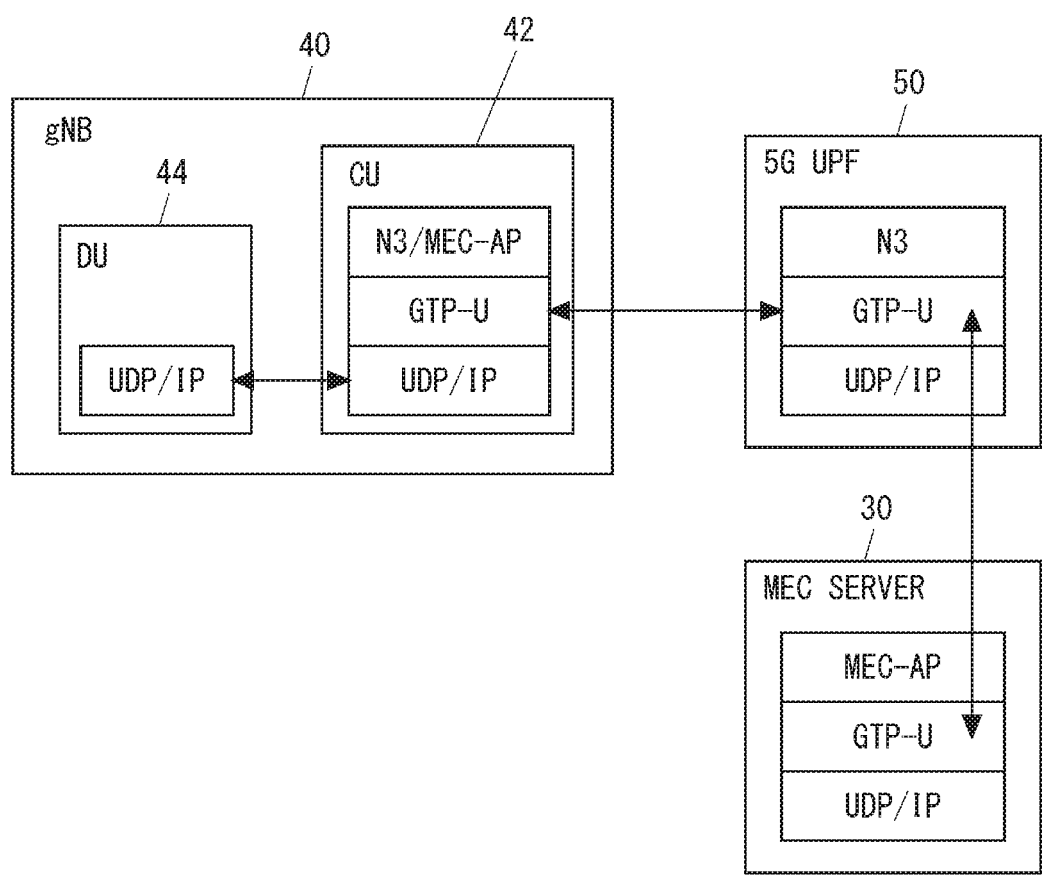
FIG. 5 is a diagram showing a configuration example of a mobile communication network according to an embodiment.

In the example of FIG. 5, the MEC server 30 uses the GTP-U protocol to communicate with the UPF 50, which is a core network node. The UPF 50 shown in FIG. 5 may be a gateway for local breakout. Specifically, the UPF 50 may be located at the edge of the 5G RAN to enable context aware service delivery and low latency services.

In FIG. 5, similarly to the example of FIG. 4, the gNB 40 (the CU 42) may use the GTP-U protocol to transfer user packets to be transmitted between a mobile edge application instantiated on the MEC server 30 and a UE application running in a UE. The user packets are transferred between the gNB 40 and the MEC server 30 through a GTP tunnel between the gNB 40 and the UPF 50 and through a GTP tunnel between the UPF 50 and the MEC server 30.

Furthermore, in the example of FIG. 5, the UPF 50 uses the GTP-U protocol to send MEC-related control information to the MEC server 30 and to receive MEC-related control information from the MEC server 30. The MEC-related control information may be exchanged between the gNB 40 and the MEC server 30. In other words, the UPF 50 may relay the MEC-related control information between the gNB 40 and the MEC server 30.

Figure 6:
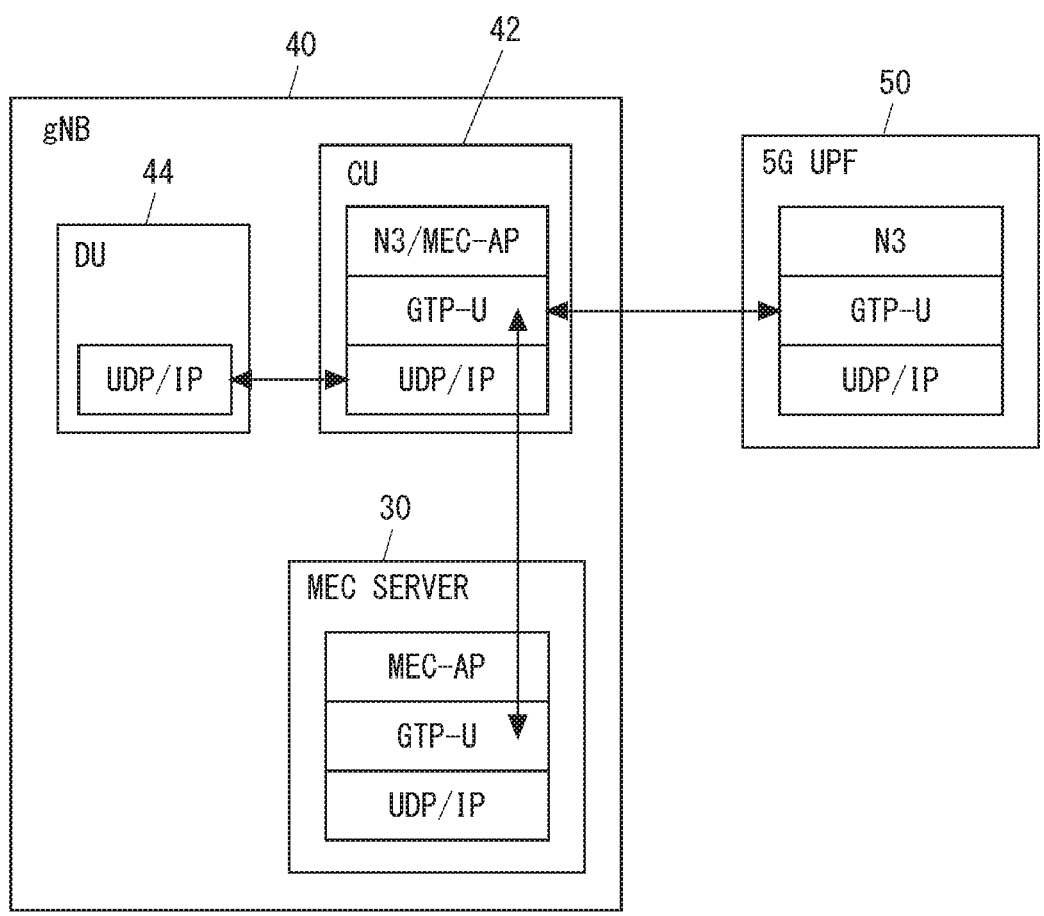
FIG. 6 is a diagram showing a configuration example of a mobile communication network according to an embodiment.
Figure 7:
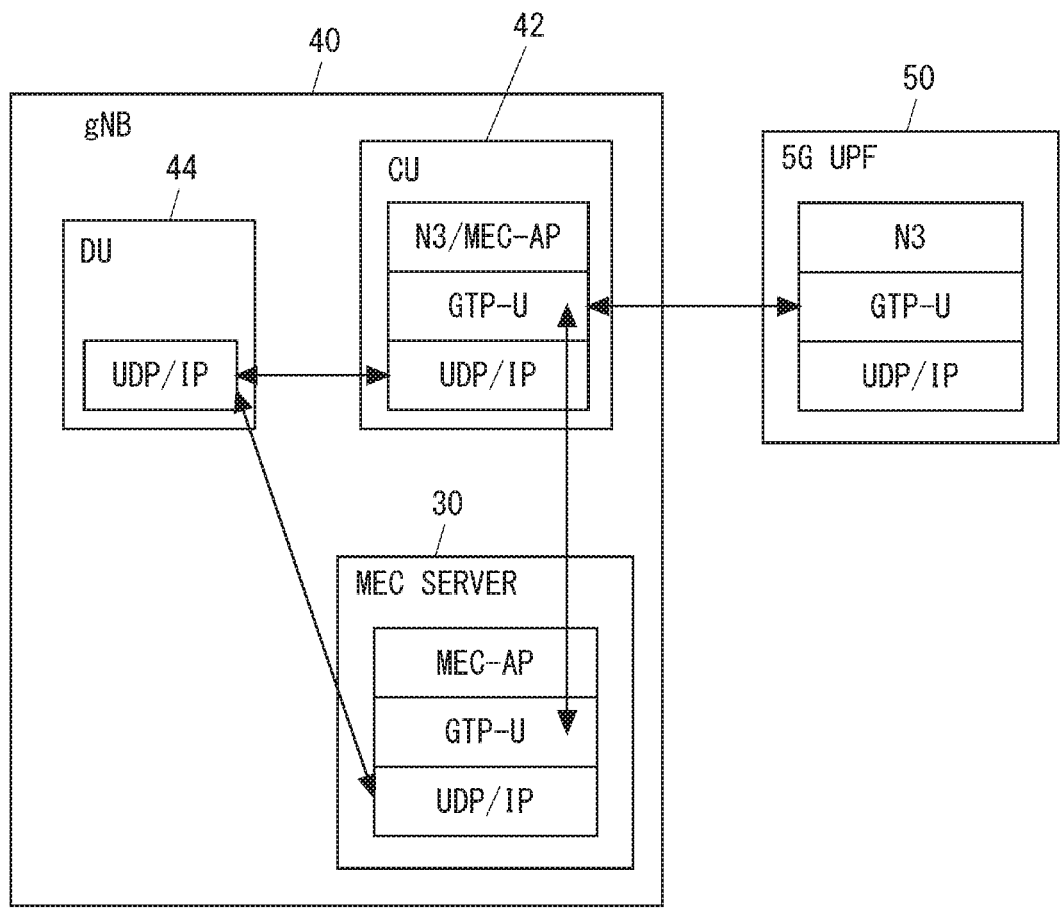
FIG. 7 is a diagram showing a configuration example of a mobile communication network according to an embodiment.

The configuration example of FIG. 6 is a modification of the configuration example shown in FIG. 4, and clearly indicates that the MEC server 30 is located in the same site as the gNB 40. Meanwhile, the configuration example of FIG. 7 shows a modification of the configuration example of FIG. 6. In the configuration example of FIG. 7, the MEC server 30 sends downlink user packets from a mobile edge application to a UE through the DU 44 (and not through the CU 42), and receives uplink user packets from the UE through the DU 44 (and not through the CU 42). In the example of FIG. 7, the DU 44 supports the user plane protocol stack of the 5G RAN including a Packet Data Convergence Protocol (PDCP).

Instead of the configuration examples shown in FIGS. 4 to 7, the MEC server 30 may be located between the gNB 40 and the UPF 50. In this case, the above-described user packets are transferred between the gNB 40 and the UPF 50 through a GTP tunnel between the gNB 40 and the MEC server 30 and through a GTP tunnel between the MEC server 30 and the UPF 50.

The embodiments according to FIGS. 1 to 7 provide the examples in which the GTP-U protocol is used. However, the GTP-U protocol is merely an example of an encapsulation protocol for encapsulating user packets originated from or destined for a UE. The embodiments according to FIGS. 1 to 7 may be modified to use an encapsulation protocol different from the GTP-U protocol. For example, the 5G system, the standardization of which is currently underway, may use an encapsulation protocol different from the GTP-U protocol to transfer user data in the 5G network. The encapsulation protocol can be referred to as a tunneling protocol.

As can be understood from the above description, in the embodiments according to FIGS. 1 to 7, the network apparatus (e.g., eNB 10, S-GW 20, MEC server 30, gNB 40, CU 42, or UPF 50) incorporates MEC-related control information into a header part of a PDU of an encapsulation protocol that is used to encapsulate user packets originated from or destined for a UE. Further, the network apparatus transmits the encapsulation protocol PDU whose header part contains the MEC-related control information. Accordingly, in the embodiments according to FIGS. 1 to 7, the encapsulation protocol for transferring user packets between the RAN and the core network can also be used to send the MEC-related control information. The embodiments according to FIGS. 1 to 7 thus enable the MEC server 30 and the network node (e.g., eNB 10, S-GW 20, gNB 40, or UPF 50) to exchange the MEC-related control information with each other in an uncomplicated manner.

Figure 8:
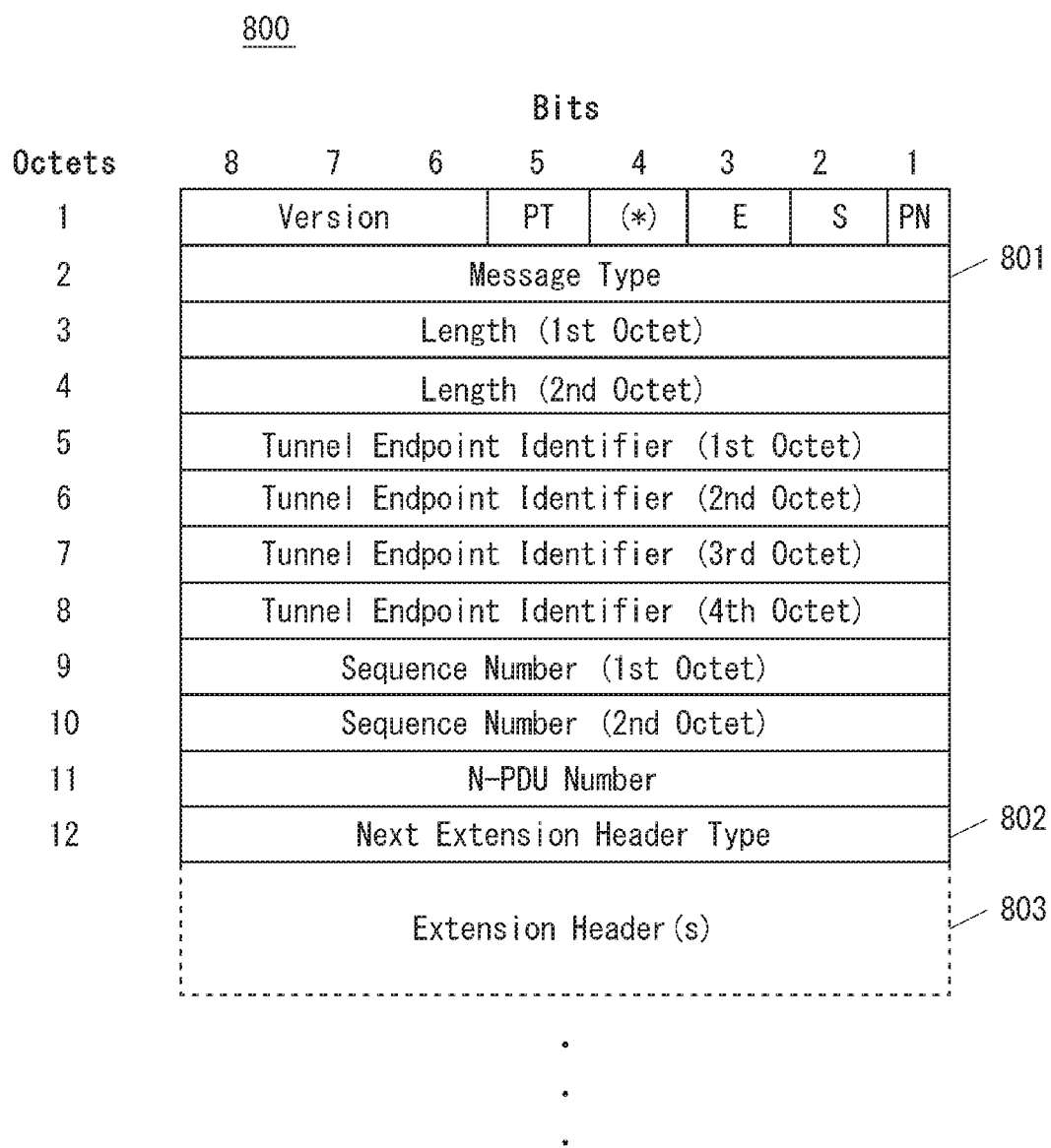
FIG. 8 is a diagram showing a configuration example of a GTP-U header according to an embodiment.

The following provides details of the enhancements or improvements to the GTP-U protocol to allow for sending the MEC-related control information with reference to FIGS. 8 to 11. FIG. 8 shows a configuration of a GTP-U header 800 contained in the GTP-PDU. The GTP-PDU is also referred to as a GTP-U message. The GTP-PDU is either a G-PDU or a signaling message. The G-PDU is used to carry a User data packet (i.e., a Transport PDU (T-PDU)). The G-PDU consists of a User data packet (T-PDU) and a GTP-U header. Meanwhile, unlike the G-PDU, the signaling message is a control message sent between the GTP-U tunnel endpoints to perform path management or tunnel management. The signaling message consists of a GTP-U header and zero or more Information Elements (IEs).

A message type field 801 in the GTP-U header 800 indicates a type of the GTP-PDU (i.e., GTP-U message). For example, when the GTP-U message is a G-PDU (i.e., GTP-PDU carrying a user IP packet), the message type field 801 has a decimal value of 255. On the other hand, when the GTP-U message is a signaling message, the message type field 801 has a decimal value of 1, 2, 26, 31, or 254. When the message type value (decimal) is 1, 2, 26, 31, or 254, the GTP-U message is an Echo Request for path management, an Echo Response for path management, an Error Indication for tunnel management, a Supported Extension Headers Notification for path management, or an End Marker for tunnel management.

In some implementations, the GTP-U header 800 of the GTP-PDU carrying the MEC-related control information may include the message type field 801 having a decimal value of 255 corresponding to the G-PDU. Further, an extension header 803 may be used to carry the MEC-related information. The extension header 803 is included in the GTP-U header 800. A next extension header type field 802 indicates a type of an extension header following it. When a decimal value of 255 corresponding to the G-PDU is set in the GTP-U header 800 of the GTP-PDU carrying the MEC-related control information, the GTP-PDU may not include a payload containing a User data packet (i.e., Transport PDU (T-PDU)).

FIG. 9 shows a specific example of the values to be set in the next extension header type field 802. In the example of FIG. 9, two values indicating the MEC-related control information have been newly defined. In the example of FIG. 9, the value of "1000 1000" indicates that the type of the extension header is a MEC Container from eNB/gNB extension header 901. Similarly, the value of "1000 1001" indicates that the type of the extension header is a MEC Container from MEC server extension header 902. The MEC Container from eNB/gNB extension header 901 contains a MEC Container from eNB/gNB that carries the MEC-related control information to be sent from the eNB 10 or the gNB 40 to the MEC server 30. The MEC Container from MEC server extension header 902 contains a MEC Container from MEC server that carries the MEC-related control information to be sent from the MEC server 30 to the eNB 10 or the gNB 40.

Figure 10:
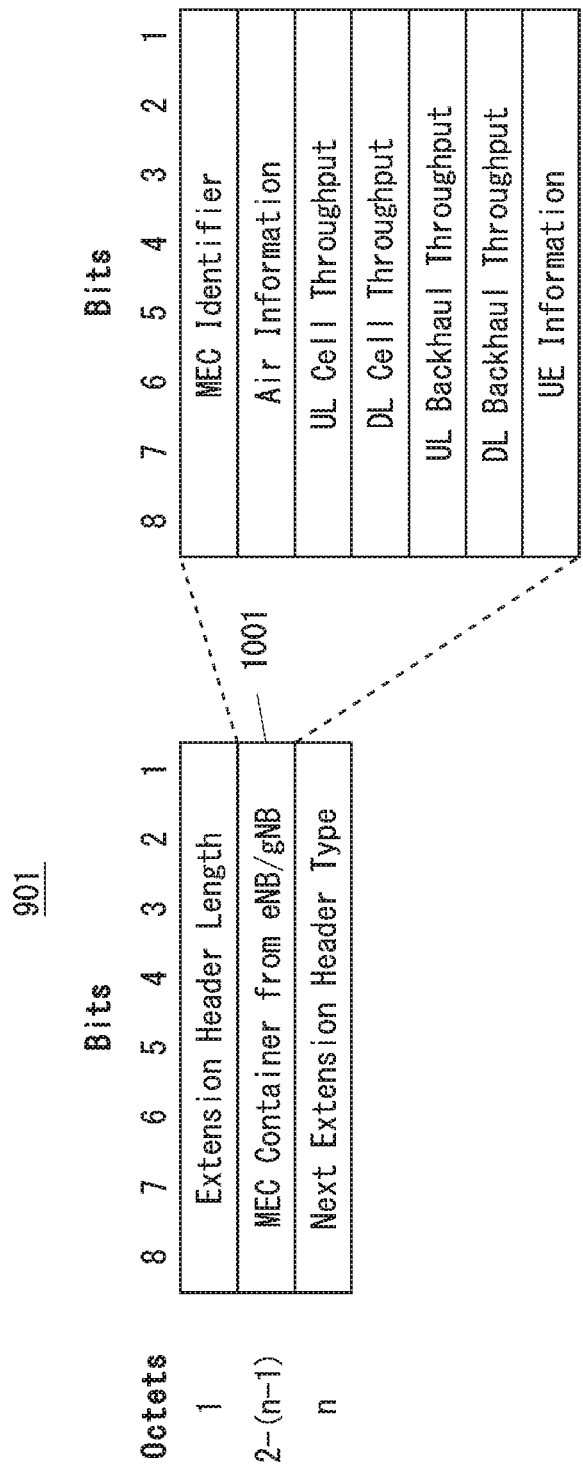
FIG. 10 is a diagram showing an example of an extension header according to an embodiment.

FIG. 10 shows a specific example of the MEC Container from eNB/gNB extension header 901. The MEC Container from eNB/gNB extension header 901 contains a MEC Container from eNB/gNB field 1001. The MEC Container from eNB/gNB field 1001 indicates, for example, at least one of: a MEC Identifier; radio interface quality (Air Information); uplink cell throughput (UL Cell Throughput); downlink cell throughput (DL Cell Throughput); uplink backhaul throughput (UL Backhaul Throughput); down link backhaul throughput (DL Backhaul Throughput); or UE information. The MEC identifier identifies a session related to the MEC between the eNB/gNB and the MEC server.

Figure 11:
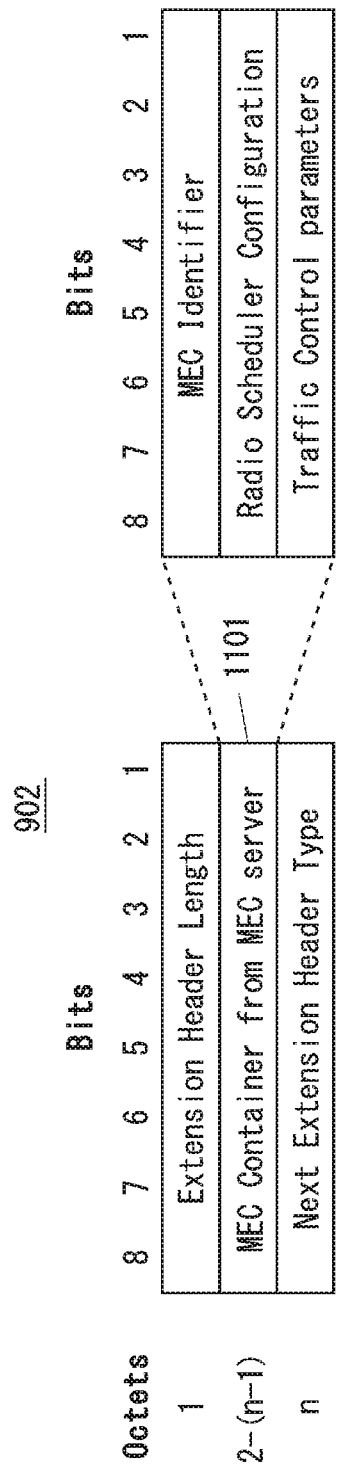
FIG. 11 is a diagram showing an example of an extension header according to an embodiment.

FIG. 11 shows a specific example of the MEC Container from MEC server extension header 902. The MEC Container from MEC server extension header 902 contains a MEC Container from MEC server field 1101. The MEC Container from MEC server field 1101 indicates, for example, at least one of: a MEC identifier; a Radio Scheduler Configuration; or Traffic Control parameters.

Using the extension header in the GTP-U header to carry the MEC-related control information provides, for example, the following advantage. The GTP-U protocol specifies that when a GTP entity does not support a mandatory extension header, the GTP entity sends a "Supported Extension Headers Notification" to the peer GTP entity. The "Supported Extension Headers Notification" is a signaling message for path management and indicates a list of extension header types supported by a transmission source GTP entity. Further, the GTP-U protocol specifies that when a GTP entity receives an unsupported extension header, the GTP entity ignores the received extension header. Thus, the above-described implementation in which the extension header in the GTP-U header is used to carry the MEC-related control information can contribute to the stabilization of the operation of the network.

Figure 12:
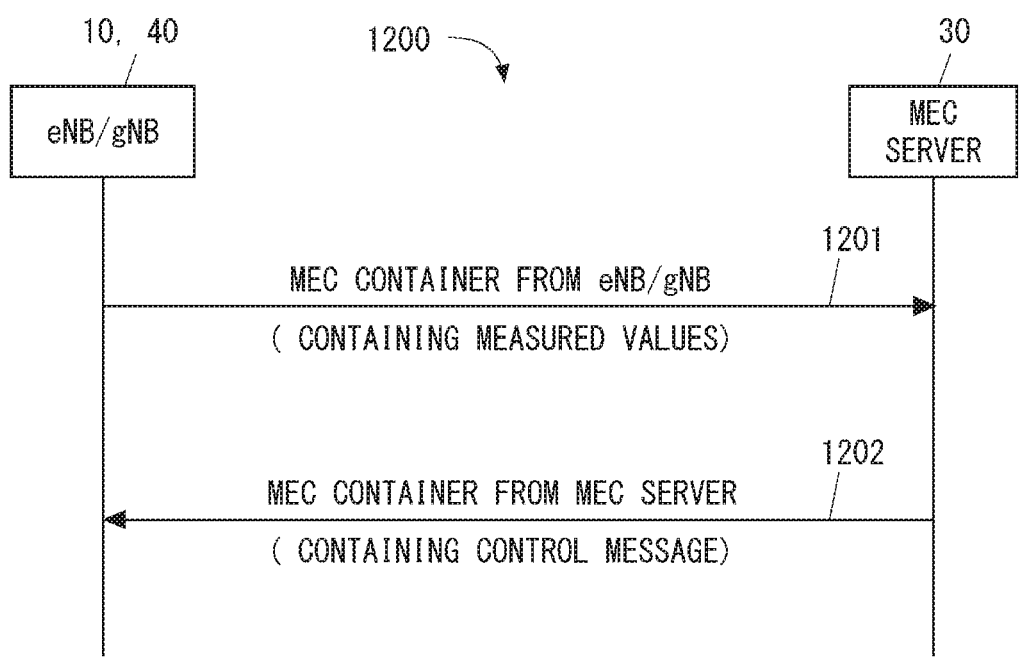
FIG. 12 is a sequence diagram showing an example of signaling between eNB/gNB and a MEC server according to an embodiment.

FIG. 12 is a sequence diagram showing a process 1200 that is an example of signaling between the eNB 10 (or the gNB 40) and the MEC server 30. In Step 1201, the eNB 10 (or the gNB 40) sends, to the MEC server 30, a MEC Container from eNB/gNB carrying MEC-related control information. The MEC-related control information carried by the MEC Container from eNB/gNB includes, for example, a measured value(s) of one or more quality parameters (e.g., CQI, cell throughput, backhaul throughput). The eNB 10 (or the gNB 40) may periodically send the MEC Container from eNB/gNB of Step 1201, or may aperiodically send it in response to a predetermined trigger event. In Step 1202, the MEC server 30 sends, to the eNB 10 (or the gNB 40), a MEC Container from MEC server carrying MEC-related control information. As described above, the MEC-related control information carried by the MEC Container from MEC server may include a radio resource control request or a traffic control request.

Figure 13:
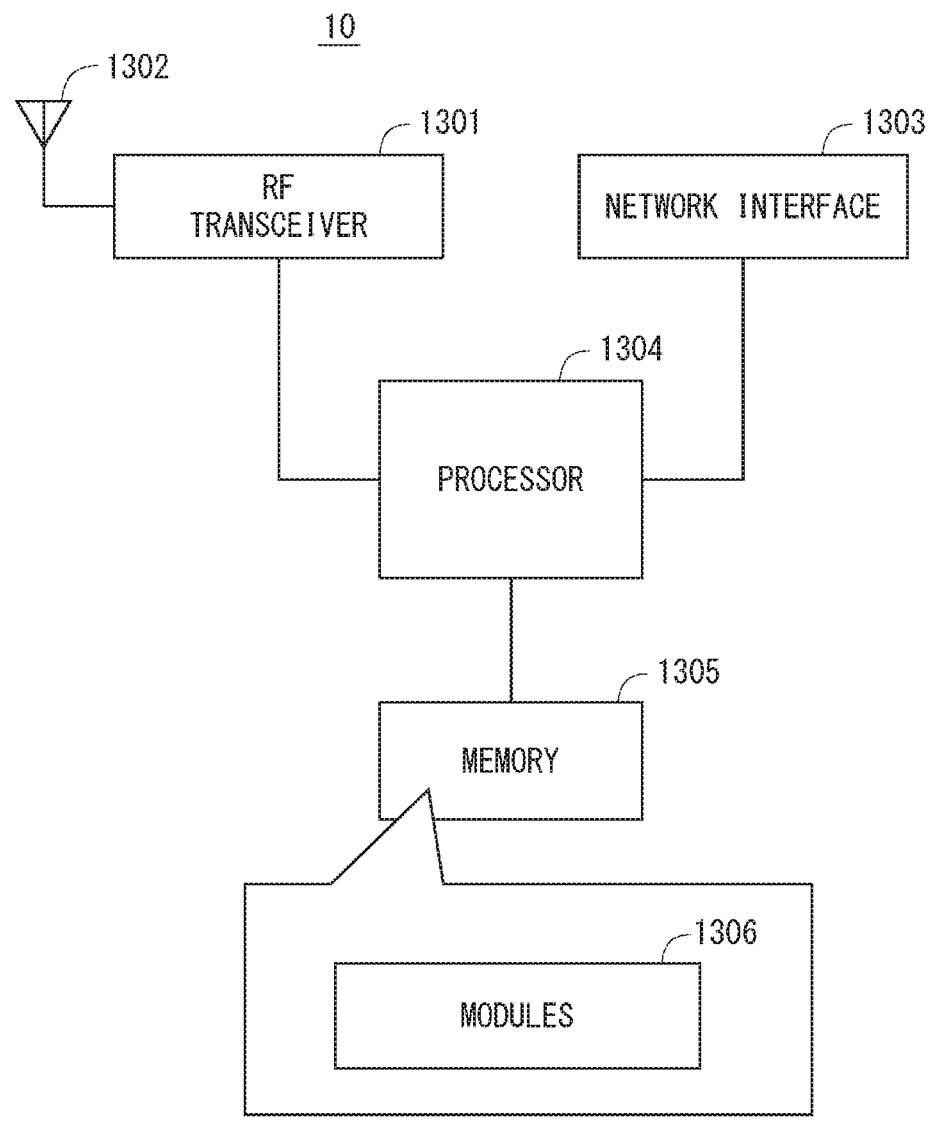
FIG. 13 is a diagram showing a configuration example of an eNB according to an embodiment.

The following provides configuration examples of the eNB 10, the S-GW 20, the MEC server 30, the gNB 40, the CU 42, and the UPF 50 according to the above-described embodiments. FIG. 13 is a block diagram showing a configuration example of the eNB 10. The configuration of the gNB 40 may be similar to that of FIG. 13. Referring to FIG. 13, the eNB 10 includes a Radio Frequency (RF) transceiver 1301, a network interface 1303, a processor 1304, and a memory 1305. The RF transceiver 1301 performs analog RF signal processing to communicate with a UE. The RF transceiver 1301 may include a plurality of transceivers. The RF transceiver 1301 is coupled to an antenna 1302 and the processor 1304. The RF transceiver 1301 receives modulated symbol data (or OFDM symbol data) from the processor 1304, generates a transmission RF signal, and supplies the transmission RF signal to the antenna 1302. Further, the RF transceiver 1301 generates a baseband reception signal based on a reception RF signal received by the antenna 1302 and supplies it to the processor 1304.

The network interface 1303 is used to communicate with network nodes (e.g., the S-GW 20, the MEC server 30, and a Mobility Management Entity (MME)). The network interface 1303 may include, for example, a network interface card (NIC) conforming to the IEEE 802.3 series.

The processor 1304 performs digital baseband signal processing (i.e., data-plane processing) and control-plane processing for radio communication. For example, in the case of LTE or LTE-Advanced, the digital baseband signal processing performed by the processor 1304 may include signal processing of Packet Data Convergence Protocol (PDCP), Radio Link Control (RLC), Medium Access Control (MAC), and physical (PHY) layers. Further, the control-plane processing performed by the processor 1304 may include processing of S1-MME, GTP-U, and Radio Resource Control (RRC) protocols and processing of MAC Control Elements (MAC CEs).

The processor 1304 may include a plurality of processors. The processor 1304 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing.

The memory 1305 is composed of a volatile memory and a non-volatile memory. The memory 1305 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1305 may include a storage located apart from the processor 1304. In this case, the processor 1304 may access the memory 1305 through the network interface 1303 or an I/O interface (not shown).

The memory 1305 may store one or more software modules (computer programs) 1306 including instructions and data to perform processing by the eNB 10 described in the above-described embodiments. In some implementations, the processor 1304 may be configured to load the software modules 1306 from the memory 1305 and execute the loaded software modules, thereby performing processing of the eNB 10 described in the above-described embodiments with reference to the sequence diagrams and the flowcharts.

Figure 14:
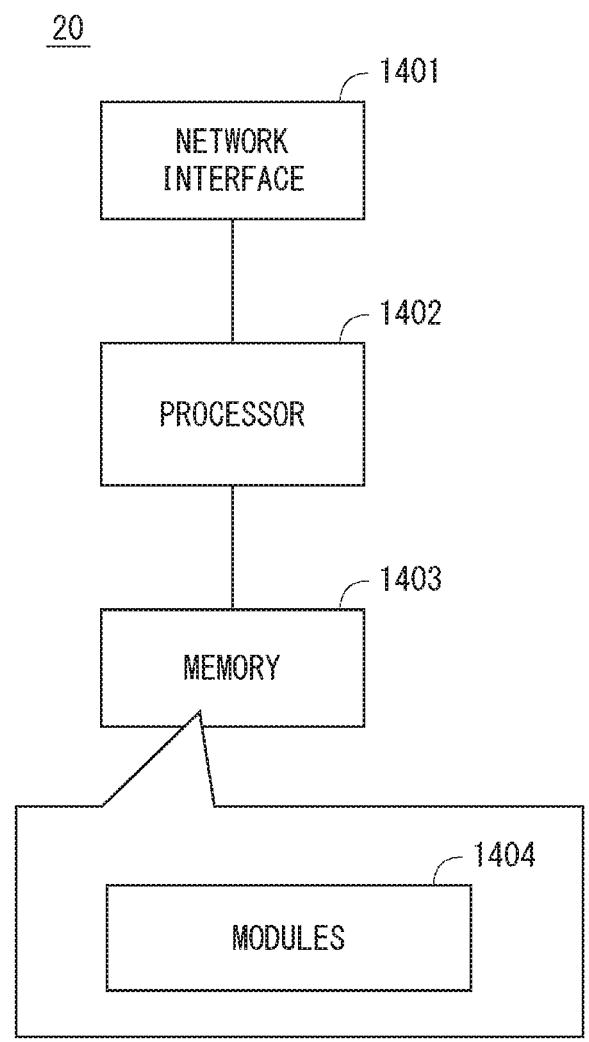
FIG. 14 is a diagram showing a configuration example of an S-GW according to an embodiment.

FIG. 14 is a block diagram showing a configuration example of the S-GW 20. The configurations of the CU 42 and the UPF 50 may be similar to that of FIG. 14. Referring to FIG. 14, the S-GW 20 includes a network interface 1401, a processor 1402, and a memory 1403. The network interface 1401 is used to communicate with network nodes (e.g., the eNB 10, the MEC server 30, the P-GW, and an MME).

The network interface 1401 may include, for example, a network interface card (NIC) conforming to the IEEE 802.3 series.

The processor 1402 may be configured to load software (computer program(s)) from the memory 1403 and execute the loaded software, thereby performing processing of the S-GW 20 described in the above embodiments. The processor 1402 may be, for example, a microprocessor, an MPU, or a CPU. The processor 1402 may include a plurality of processors.

The memory 1403 is composed of a volatile memory and a non-volatile memory. The memory 1403 may include a plurality of memory devices that are physically independent from each other. The non-volatile memory is, for example, an MROM, a PROM, a flash memory, a hard disc drive, or any combination thereof. The memory 1403 may include a storage located apart from the processor 1402. In this case, the processor 1402 may access the memory 1403 through the network interface 1401 or an I/O interface (not shown).

The memory 1403 may store one or more software modules (computer programs) 1404 including instructions and data to perform processing by the S-GW 20 described in the above embodiments. In some implementations, the processor 1402 may be configured to load the software modules 1404 from the memory 1403 and execute the loaded software modules, thereby performing processing of the S-GW 20 described in the above embodiments.

FIG. 15 is a block diagram showing a configuration example of the MEC server 30. Referring to FIG. 15, the MEC server 30 includes hardware components including a network interface 1501, a processor 1502, and a memory (or a storage) 1503. The network interface 1501 is used to communicate with a network node (e.g., the eNB, the S-GW 20, the gNB 40, the CU 42, the DU 44, or the UPF 50). The network interface 1501 may include, for example, a network interface card (NIC) conforming to the IEEE 802.3 series.

The processor 1502 may be configured to load software (computer program(s)) from the memory 1503 and execute the loaded software, thereby performing processing of the MEC server 30 described in the above embodiments. The processor 1502 may be, for example, a microprocessor, an MPU, or a CPU. The processor 1502 may include a plurality of processors.

The memory 1503 is composed of a volatile memory and a non-volatile memory. The memory 1503 may include a plurality of memory devices that are physically independent from each other. The memory 1503 may include a storage located apart from the processor 1502. In this case, the processor 1502 may access the memory 1503 through the network interface 1501 or an I/O interface (not shown).

In the example of FIG. 15, the memory 1503 is used to store software modules 1504 to 1506 for providing MEC service and a module 1507 for exchanging MEC-related control information. The virtualization management software 1504 is executed by the processor 1502 to virtualize hardware components including the network interface 1501, the processor 1502, and the memory 1503 and provide Infrastructure as a Service (IaaS) or Platform as a Service (PaaS) facilities, thereby providing a hosting environment for one or more MEC applications 1506.

The application platform services software 1505 is executed by the processor 1502 to provide one or more MEC applications 1506 with middleware services such as a communication service, a radio network information service, and a traffic offload function.

The one or more MEC applications 1506 are mobile edge applications hosted on the MEC server 30. The one or more MEC applications 1506 uses communication services provided by the application platform services software 1505 to communicate with a UE application running in a UE.

The module 1507 is executed by the processor 1502, and provides the function of the MEC server 30 for exchanging MEC-related control information as described in the above embodiments.

Other Embodiments

Each of the above-described embodiments may be used individually, or two or more of the embodiments may be appropriately combined with one another.

The above-described embodiments are merely examples of applications of the technical ideas obtained by the inventor. These technical ideas are not limited to the above-described embodiments and various modifications can be made thereto.

For example, the whole or part of the above embodiments can be described as, but not limited to, the following supplementary notes.
(Supplementary Note 1)
A network apparatus, comprising:
at least one memory; and
at least one processor coupled to the at least one memory and configured to:
incorporate edge computing related control information into a header part of a protocol data unit of an encapsulation protocol, the encapsulation protocol being used to encapsulate a user packet originated from or destined for a radio terminal; and
transmit the protocol data unit whose header part contains the edge computing related control information.
(Supplementary Note 2)
The network apparatus according to Supplementary Note 1, wherein the edge computing related control information is to be sent from a server to a radio access network node or vice versa, wherein the server is configured to provide one or both of computing resources and storage resources to a service or an application directed to the radio terminal.
(Supplementary Note 3)
The network apparatus according to Supplementary Note 2, wherein
the network apparatus is the radio access network node, or a core network node located between the radio access network node and the server, and
the edge computing related control information includes first control information to be sent from the radio access network node or the core network node to the server.
(Supplementary Note 4)
The network apparatus according to Supplementary Note 3, wherein the first control information includes at least one of: radio interface quality; cell throughput; backhaul throughput; information about a service used by the radio terminal; or priority information of the radio terminal.
(Supplementary Note 5)
The network apparatus according to Supplementary Note 2, wherein
the network apparatus is the server, and
the edge computing related control information includes second control information to be sent from the server to the radio access network node.
(Supplementary Note 6)
The network apparatus according to Supplementary Note 5, wherein the second control information includes one or both of:

a radio resource control request requesting the radio access network node to adjust radio resource management or radio resource scheduling in a radio access network; and a traffic control request requesting the radio access network node to adjust traffic control for user packets to be sent from the radio access network to the server or a core network.

(Supplementary Note 7)

The network apparatus according to any one of Supplementary Notes 1 to 6, wherein the encapsulation protocol is identical to an encapsulation protocol used to transfer user packets of the radio terminal between a core network node and a radio access network node.

(Supplementary Note 8)

The network apparatus according to any one of Supplementary Notes 1 to 7, wherein the encapsulation protocol is a General Packet Radio Service (GPRS) Tunneling Protocol for User Plane (GTP-U).

(Supplementary Note 9)

The network apparatus according to Supplementary Note 8, wherein the header part includes:

a message type field indicating that the protocol data unit is a protocol data unit carrying a user packet;

a next extension header type field indicating that the header part includes a first extension header containing the edge computing related control information; and the first extension header containing the edge computing related control information.

(Supplementary Note 10)

A method for a network apparatus, the method comprising:

incorporating edge computing related control information into a header part of a protocol data unit of an encapsulation protocol, the encapsulation protocol being used to encapsulate a user packet originated from or destined for a radio terminal; and transmitting the protocol data unit whose header part contains the edge computing related control information.

(Supplementary Note 11)

The method according to Supplementary Note 10, wherein the edge computing related control information is to be sent from a server to a radio access network node or vice versa, wherein the server is configured to provide one or both of computing resources and storage resources to a service or an application directed to the radio terminal.

(Supplementary Note 12)

The method according to Supplementary Note 11, wherein the network apparatus is the radio access network node, or a core network node located between the radio access network node and the server, and the edge computing related control information includes first control information to be sent from the radio access network node or the core network node to the server.

(Supplementary Note 13)

The method according to Supplementary Note 12, wherein the first control information includes at least one of: radio interface quality; cell throughput; backhaul throughput; information about a service used by the radio terminal; or priority information of the radio terminal.

(Supplementary Note 14)

The method according to Supplementary Note 11, wherein the network apparatus is the server, and the edge computing related control information includes second control information to be sent from the server to the radio access network node.

(Supplementary Note 15)

The method according to Supplementary Note 14, wherein the second control information includes one or both of:

a radio resource control request requesting the radio access network node to adjust radio resource management or radio resource scheduling in a radio access network; and a traffic control request requesting the radio access network node to adjust traffic control for user packets to be sent from the radio access network to the server or a core network.

(Supplementary Note 16)

The method according to any one of Supplementary Notes 10 to 15, wherein the encapsulation protocol is identical to an encapsulation protocol used to transfer user packets of the radio terminal between a core network node and a radio access network node.

(Supplementary Note 17)

The method according to any one of Supplementary Notes 10 to 16, wherein the encapsulation protocol is a General Packet Radio Service (GPRS) Tunneling Protocol for User Plane (GTP-U).

(Supplementary Note 18)

The method according to Supplementary Note 17, wherein the header part includes:

a message type field indicating that the protocol data unit is a protocol data unit carrying a user packet;

a next extension header type field indicating that the header part includes a first extension header containing the edge computing related control information; and the first extension header containing the edge computing related control information.

(Supplementary Note 19)

A program for causing a computer to perform a method for a network apparatus, wherein the method comprises incorporating edge computing related control information into a header part of a protocol data unit of an encapsulation protocol, the encapsulation protocol being used to encapsulate a user packet originated from or destined for a radio terminal.

(Supplementary Note 20)

The program according to Supplementary Note 19, wherein the edge computing related control information is to be sent from a server to a radio access network node or vice versa, wherein the server is configured to provide one or both of computing resources and storage resources to a service or an application directed to the radio terminal.

This application is based upon and claims the benefit of priority from Japanese Patent Application No. 2017-076619, filed on Apr. 7, 2017, the disclosure of which is incorporated herein in its entirety by reference.

REFERENCE SIGNS LIST 10 eNB
20 S-GW
30 MEC SERVER
40 gNB
50 UPF

The invention claimed is:

1. A first network node to be located in a radio access network or a core network, comprising:
   at least one memory; and
   at least one processor coupled to the at least one memory and configured to:
      transmit a first protocol data unit of an encapsulation protocol to a second network node located in the radio access network or the core network, or receive the first protocol data unit of the encapsulation protocol from the second network node located in the radio access network or the core network, wherein the first protocol data unit contains a payload containing a user packet originated from or destined for a radio terminal;

incorporate edge computing related control information into a header part of a second protocol data unit of the same encapsulation protocol; and transmit, to an edge computing server that is different from the second network node and located outside both the radio access network and the core network, the second protocol data unit whose header part contains the edge computing related control information, wherein the encapsulation protocol is a General Packet Radio Service (GPRS) Tunneling Protocol for User Plane (GTP-U), and the header part includes:
  a message type field indicating that the protocol data unit is a protocol data unit carrying a user packet;
  a next extension header type field indicating that the header part includes a first extension header containing the edge computing related control information; and
  the first extension header containing the edge computing related control information.

2. The first network node according to claim 1, wherein the edge computing server is configured to provide one or both of computing resources and storage resources to a service or an application directed to the radio terminal through the radio access network.

3. The first network node according to claim 1, wherein the edge computing related control information includes at least one of: radio interface quality; cell throughput; backhaul throughput; information about a service used by the radio terminal; or priority information of the radio terminal.

4. A method for a first network node to be located in a radio access network or a core network, the method comprising:

transmitting a first protocol data unit of an encapsulation protocol to a second network node located in the radio access network or the core network, or receiving the first protocol data unit of the encapsulation protocol from the second network node located in the radio access network or the core network, wherein the first protocol data unit contains a payload containing a user packet originated from or destined for a radio terminal;

incorporating edge computing related control information into a header part of a second protocol data unit of the same encapsulation protocol; and transmitting, to an edge computing server that is different from the second network node and located outside both the radio access network and the core network, the second protocol data unit whose header part contains the edge computing related control information, wherein the encapsulation protocol is a General Packet Radio Service (GPRS) Tunneling Protocol for User Plane (GTP-U), and the header part includes:
  a message type field indicating that the protocol data unit is a protocol data unit carrying a user packet;
  a next extension header type field indicating that the header part includes a first extension header containing the edge computing related control information; and
  the first extension header containing the edge computing related control information.

5. The method according to claim 4, wherein the edge computing server is configured to provide one or both of computing resources and storage resources to a service or an application directed to the radio terminal through the radio access network.

6. The method according to claim 4, wherein the edge computing related control information includes at least one of: radio interface quality; cell throughput; backhaul throughput; information about a service used by the radio terminal; or priority information of the radio terminal.

7. A non-transitory computer readable medium storing a program for causing a computer to perform a method for a first network node to be located in a radio access network or a core network, wherein the method comprises:
transmitting a first protocol data unit of an encapsulation protocol to a second network node located in the radio access network or the core network, or receiving the first protocol data unit of the encapsulation protocol from the second network node located in the radio access network or the core network, wherein the first protocol data unit contains a payload containing a user packet originated from or destined for a radio terminal;

incorporating edge computing related control information into a header part of a second protocol data unit of the same encapsulation protocol; and transmitting, to an edge computing server that is different from the second network node and located outside both the radio access network and the core network, the second protocol data unit whose header part contains the edge computing related control information, wherein the encapsulation protocol is a General Packet Radio Service (GPRS) Tunneling Protocol for User Plane (GTP-U), and the header part includes:
  a message type field indicating that the protocol data unit is a protocol data unit carrying a user packet;
  a next extension header type field indicating that the header part includes a first extension header containing the edge computing related control information; and
  the first extension header containing the edge computing related control information.

8. The non-transitory computer readable medium according to claim 7, wherein the edge computing server is configured to provide one or both of computing resources and storage resources to a service or an application directed to the radio terminal through the radio access network.

* * * * *